United States Patent [19]
Black et al.

[11] Patent Number: 5,128,509
[45] Date of Patent: Jul. 7, 1992

[54] METHOD AND APPARATUS FOR TRANSFORMING AND STEERING LASER BEAMS

[75] Inventors: Michael Black, Foster City; Vladimir Kupershmidt, Fremont, both of Calif.

[73] Assignee: Reliant Laser Corp., Foster City, Calif.

[21] Appl. No.: 576,790

[22] Filed: Sep. 4, 1990

[51] Int. Cl.⁵ .............................................. B23K 26/00
[52] U.S. Cl. .......................... 219/121.76; 219/121.74; 219/121.78; 219/121.79; 219/121.68; 606/4; 606/18
[58] Field of Search ...................... 219/121.74, 121.76, 219/121.78, 121.75, 121.68, 121.69; 606/3, 4, 6, 13, 17, 18; 128/395

[56] References Cited

U.S. PATENT DOCUMENTS

| | | | |
|---|---|---|---|
| 4,141,362 | 2/1979 | Wurster | 128/303 |
| 4,228,341 | 10/1980 | Zandberg | 219/121 |
| 4,396,285 | 8/1983 | Presta et al. | 606/18 X |
| 4,494,540 | 1/1985 | Erb | 128/303 |
| 4,520,816 | 6/1985 | Schachar et al. | 128/303 |
| 4,526,447 | 7/1985 | Taylor | 350/636 |
| 4,597,380 | 7/1986 | Raif et al. | 128/6 |
| 4,686,992 | 8/1987 | Dewey et al. | 128/303 |

*Primary Examiner*—C. L. Albritton
*Attorney, Agent, or Firm*—David Pressman

[57] ABSTRACT

A method and apparatus for transforming and steering laser beams directed from a laser sources onto a target area and composed of a visible guide beam and an invisible power beam which is guided and aimed by observing the position of the visible beam on the target area. The optical system of the apparatus (10) consists of a concave mirror (42) and a convex mirror (76). Both mirrors face each other. A hole (43) is made in the concave mirror (42) to ensure unobstructed passage of both beams to the convex mirror (76) from which the beams are reflected in a diverging pattern onto the concave mirror (42). The latter reflects the beams in a converging form onto a beam reflecting unit, such as beam splitter (84). The beam splitter is connected to a steering mechanism, which allows manipulation of the beams reflected from the splitter so that the position of the beams on the target area can be controlled. The visible guide beam and the invisible power beam coincide with each other and produce on the target area beam spots of identical diameters. This gives to a surgeon more confidence and improves the reliability and accuracy of the operation.

27 Claims, 6 Drawing Sheets

METHOD AND APPARATUS FOR TRANSFORMING AND STEERING LASER BEAMS

BACKGROUND

1. Field of the Invention

The present invention relates to the field of laser techniques, particularly to methods and apparatus for transforming and steering laser beams, especially in the field of medical applications, such as opthalmic, surgical, and therapeutic treatments.

2. Description of Prior Art

At the present time, laser beam techniques find wide applications in surgical operations, such as incisions, tissue attachments, coagulating, etc. Typically, a laser apparatus consists of two laser beam systems, which operate on different wavelengths. One laser beam system is used to generate a power beam which performs the operation itself and operates on an invisible wavelength. The second laser beam system, which is aligned with the first one, is used for indicating the power beam and therefore operates on a visible wavelength. In other words, the surgeon using the apparatus guides the power beam in the operation area by observing the position of the visible guide beam in such area. The visible beam has lower energy than the level required for treating an object, while the power beam has a level of energy capable of performing the operation. Both beams are guided through an adjustable articulating arm or an optical fiber link, which delivers the beams to a focusing unit. One typical system of this type is decribed in U.S. Pat. No. 4,917,083 to J. Harrington and M. Clancy, 1990.

At the present time laser beam focusing systems use optical lenses as their main focusing elements. Such a focusing system, which is known as a telescope, usually consists of a tubular housing, which contains a number of lenses arranged on the general optical path and intended for focusing both laser beams on the operation area, see Micromanipulator Model 5000, produced by Coherent, Inc., Palo Alto, Calif. In operation, the user, depending on the type of the procedure, must select a proper distance to insure either focusing or defocusing conditions.

It is known, however, that all lens type systems have refraction indexes dependent upon the wavelength of the laser beam used in the system. This causes problems, which practically cannot be solved to full extent. More specifically, the power, or invisible beam is in a far infrared wavelength range, i.e., 10.6 microns, and the guide, or visible beam has a wavelength of 0.632 micron. This dependency is known as a chromatic aberration.

Aberration is a failure of a lense system to produce point-to-point correspondence between an object and its image. Chromatic aberration occurs in optical systems with several wavelengths. In other words, two coaxial laser beams of different wavelengths incident on the same point are refracted by the system to different degrees and thus cannot be focused upon the same target point.

The same phenomenon causes different absorptions of laser beams, which also leads to substantial energy losses and inaccuracy. For example, the latest laser beam steering apparatus of the Model 5000 micromanipulator produced by Coherent, Inc., which is one of the most accurate devices known in the art, specifies a minimum focusing spot diameter of 0.4 mm and maximum defocusing diameter of 8.5 mm. This means that the existing apparatus is not sufficiently accurate and therefore, unreliable and unsuitable for critical surgical procedures for which a surgeon has to be absolutely confident in that both beams are coincident in the same point and have the same spot size.

Moreover, any laser beam delivery system based on the use of optical lenses is unequivocally dedicated only to one predetermined laser source wavelength. This means that each time the user wants to change the laser wavelength (for example, for changing type of a surgical procedure) such user has to replace the laser beam steering apparatus. All of the above will not allow the surgeon to switch from one type of laser source to another without changing the original setup (for which the surgeon must purchase an additional optical delivery system for a specific wavelength). Also the surgeon cannot upgrade the procedure because of the spot size, even though the surgeon uses the same laser source.

Another disadvantage of the conventional laser beam delivery system is complicated construction, as it consists of a plurality of lenses and lens adjustment mechanisms. The complicated construction is difficult to manufacture and has a high cost because of the use of highly expensive optical substrates and coatings. The high price also results from the necessity of the purchasing and storing a set of laser sources and steering apparatuses in conjunction with various surgical procedures which may be required.

Therefore, there is a demand in the field of medical laser beam technique for a less expensive, versatile, and adjustable laser steering system.

OBJECTS AND ADVANTAGES OF THE INVENTION

It is therefore an object of the present invention to provide an apparatus for transforming and steering laser beams, which is inexpensive to manufacture, simple in construction, versatile in use, and can be utilized for various types of surgical procedures without replacements of optical delivery systems. Other objects are to substantially reduce energy losses, minimize the diameter of spot size, and broaden the range of focusing-/defocusing capabilities. Still other objects are to provide a modular beam transforming and steering apparatus, operating in all possible wavelength ranges of laser sources, to improve reliability of the above-mentioned apparatus, so that the surgeon is confident in positioning the power and guide beams in the same target point, and to provide a method for transforming and steering laser beams, utilizing a novel. Further objects and advantages will become apparent after consideration of the ensuing description and the accompanying drawings.

REFERENCE NUMERALS USED IN THE DESCRIPTION AND DRAWINGS

10—apparatus
12—telescopic unit
14—casing
16—steering mechanism
18—operating microscope
19—dovetail connection
20—laser source
21—screw
22—tubular housing
24—cylindrical telescopic sleeve
26—outer surface of sleeve
28—longitudinal slot
30—first guide pin
32—rubber jacket
34—rear end of sleeve
36—bottom wall
38—central threaded opening
39—locking mechanism
40—first mirror holder
42—concave mirror
43—opening in concave mirror
44—second guide pin
46—smaller diameter portion
48—shoulder
50—adjustment ring
52—stop ring
54,56—low friction rings
58—helical groove
60—divisions
62—scale
64—indicating mark
66—fixing ball
68—longitudinal hole
70—spring
72—front end
74—second mirror holder
76—convex mirror
78—optical path
79—optical path of microscope
80—through opening
82—longitudinal axis of casing
83—steerable beam reflecting unit
84—beam splitter
86—toroidal mirror module
88—reflecting mirror module
90—screw
92—manipulating handle
94—handrest
96—screws
98—screws
B1—visible beam
B2—diverging beam
B3—converging beam

FIGS. 1-6 DESCRIPTION OF THE PREFERRED EMBODIMENT OF THE INVENTION

Figure 1:
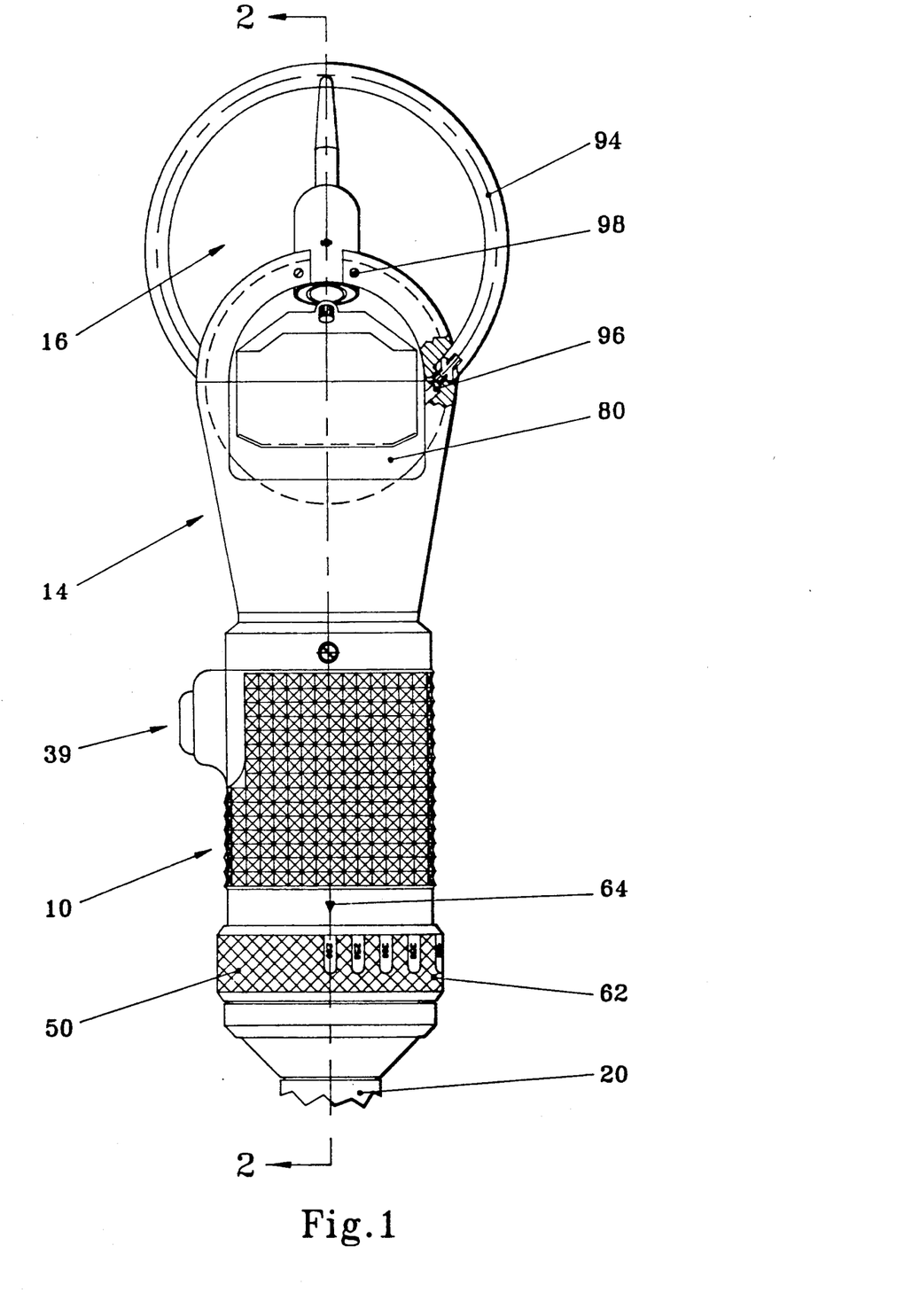
FIG. 1 is a bottom view of a modular laser beam transforming and steering apparatus of the invention.

As shown in FIG. 1, a modular apparatus for transforming and steering beams (hereinafter referred to as an "apparatus"), generally is designated by reference numeral 10. It consists of a telescopic unit 12, a casing 14, and a steering mechanism 16.

Apparatus 10 is connected to an operating microscope 18, e.g., by means of dovetail connection 19 (FIG. 3) and is fixed to the microscope by a screw 21. A surgeon uses a microscope for observing and manipulating laser beams B and directing them to the target area (not shown in the drawing). The apparatus is also connected to a laser source 20 which generates the abovementioned laser beams. The function of apparatus 10 is to transform, focus and direct laser beams on the target area. Although not part of the invention, laser source 20 may be a System 451 C02 Surgical Laser manufactured by Coherent, Inc. of Palto Alto, Calif., the power beam of which operates at a wavelength of 10.6 microns with a power of 30 W, and a visible beam of which operates at a wavelength of 0.633 micron with a power of 0.8 mW. Such a laser typically may be used for the gynecological procedures, e.g., the destruction and removal of the neoplastic disease (tumors), cauterization and coagulation of smaller vascular channels, thereby preventing bleeding, etc.

Telescopic unit 12 has a tubular housing 22 which is rigidly attached to, or made integrally with casing 14. A cylindrical telescopic sleeve 24 is slidingly fitted over the outer surface 26 of housing 22. In order to prevent telescopic sleeve 24 from rotation with respect to housing 22, the housing has a longitudinal slot 28 (FIG. 2) in its outer surface 26. For this purpose, a first guide pin 30 is attached to telescopic sleeve 24. Pin 30 extends inwardly from the sleeve into slot 28. To facilitate telescopic movement of sleeve 24 in the longitudinal direction of housing 22, its outer surface is coated with a rubber jacket 32 having a high friction surface. A rear end 34 of sleeve 24, i.e., the end of the sleeve facing the laser beam source, has a bottom wall 36 with a central threaded opening 38. Opening 38 is intended for attachment to an appropriate connector of laser source 20.

Sleeve 24 is snugly fitted onto tubular housing 22, so that it can be moved into any axial position and held in this position due to friction between the parts. If necessary, however, a positive locking mechanism 39 can be provided on sleeve 24 for fixing it to housing 22 in any selected position. The locking mechanism may have any conventional construction, such as a spring-loaded element with a friction pad. Since the construction of such mechanisms is well known in the art, it is not shown in the drawings.

A first mirror holder 40 is slidingly fitted inside sleeve 24. Holder 40 has a cup-shaped configuration and holds concave mirror 42, which can be fixed within holder 40, e.g., by an adhesive. Concave mirror 42 has a central opening 43 for passage of laser beam B, as will be described in more detail in connection with the operation of the apparatus. Attached to the outer surface of holder 40 is a second guide pin 44. Moreover, sleeve 24 has a portion 46 of smaller diameter than the front part of the sleeve 24, so that a shoulder 48 is formed between both parts. An adjustment ring 50 is slidingly fitted onto small diameter portion 46 and fixed against axial displacement by a stop ring 52. A low-friction ring 54 is located between the front end of adjustment ring 50 and shoulder 48, and a similar low-friction ring 56 is located between the rear end of adjustment ring 50 and stop ring 52. Thus, adjustment ring 50 can rotate on sleeve 24, but is restricted against axial displacement with respect to the sleeve.

A helical groove 58 (FIG. 4) is formed on the inner surface on the adjustment ring 50, and second guide pin 44 is inserted into groove 58. Since first mirror holder 40 is rigidly connected to pin 44, rotation of adjustment ring 50 will cause axial displacement of first mirror holder 40 with concave mirror 42 within sleeve 24. This is because pin 44 engages groove 58.

As shown in FIG. 1, adjustment ring 50 has a knurled surface for convenience of grasping by hand and divisions 60 of scale 62 for adjustment with indicating mark 64 formed on outer surface 26 of sleeve 24 (FIG. 1). In order to discretely fix adjustment ring 50 in predetermined angular positions of scale divisions 60 with respect to indicating mark 64, adjustment ring 50 has a fixing ball 66. Ball 66 is located in a longitudinal hole 68 of ring 50 and is constantly urged by spring 70 toward the surface of shoulder 48. Shoulder 48 has circumferentially arranged indents (not shown). Spring-loaded ball 66 and the indents cooperate and lock adjustment ring 50, and thus concave mirror 42, in a required angular position in the manner known in the art.

At a front end 72 (which is opposite to laser beam source 20), tubular housing 22 supports a second mirror holder 74, which holds a convex mirror 76. Holder 74 is rigidly attached to tubular housing 22 and is fixed, e.g., by an adhesive. The convex surface of mirror 76 faces the concave surface of mirror 42. Both mirrors, i.e., 42 and 76, are located on the same optical path 78 which coincides with optical axis of incident laser beams B from beam source 20.

In other words, the mechanism described above makes it possible to install concave mirror 42 in the required axial and angular positions with respect to convex mirror 76.

Casing 14 has a semi-cylindrical form (FIG. 1) and a viewing opening 80 to provide unobstructed view from microscope 18 (the optical system of which is not shown in the drawings). However it is understood by those skilled in the art that the optical axis of microscope 18 coincides with a longitudinal axis 82 of casing 14, which in turn is perpendicular to optical path 78 of the laser beam. It is also understood that the target point of the object being treated (which is not shown in the drawings) is also located on axis 82, but on the side opposite to the microscope.

Figure 2:
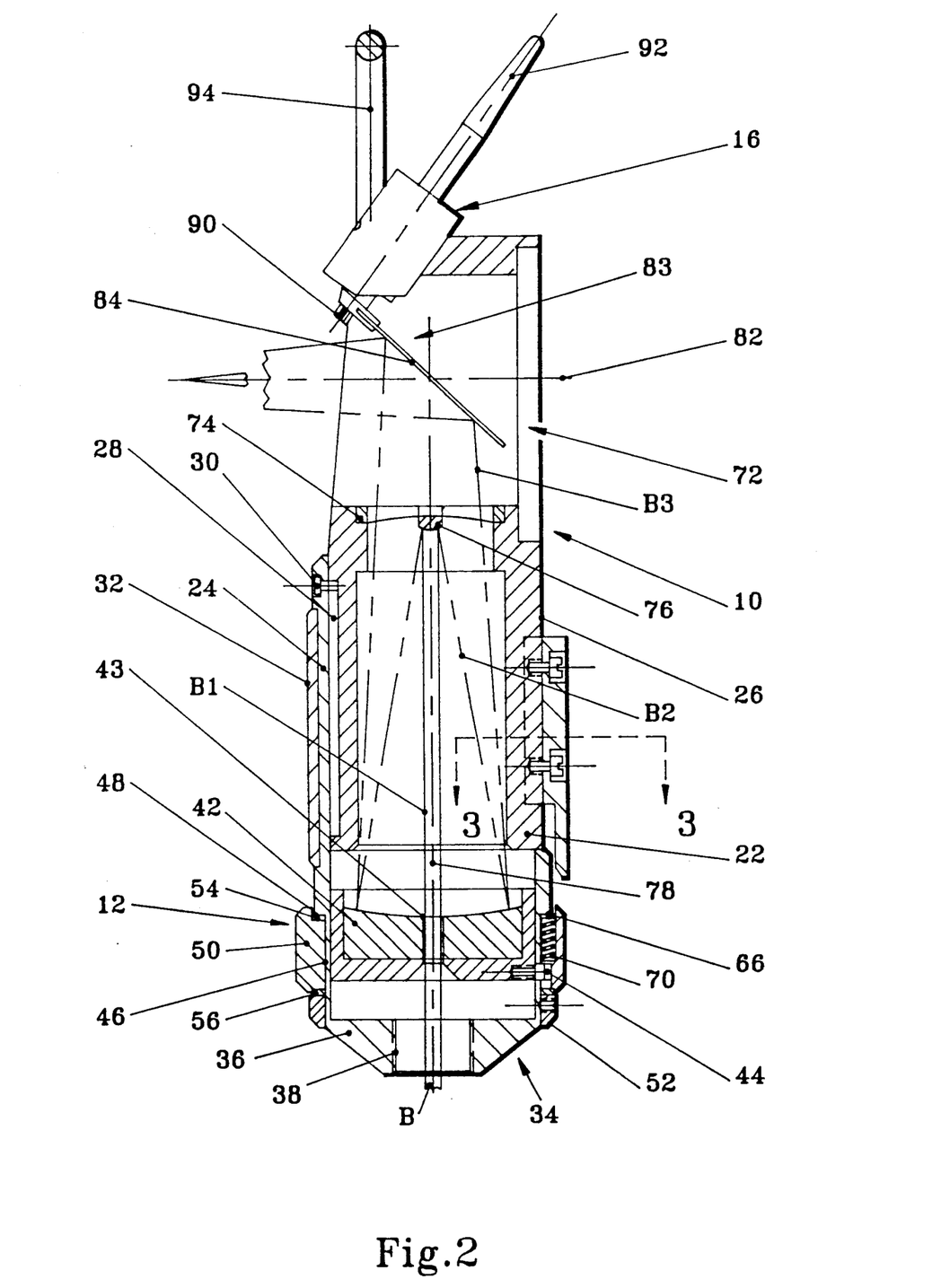
FIG. 2 is a longitudinal sectional view along the line 2—2 of FIG. 1.

An essential part of the apparatus of the invention is a steerable reflecting unit 83, which is attached to steering mechanism 16 in a manner described below. In the illustrated embodiment, beam reflecting unit 83 is made in the form of the replaceable modular unit. Three such modular units are described in the present application, i.e., modular units 84, 86 and 88, which are a beam splitter, a toroidal mirror, and a reflecting mirror, respectively. FIG. 2 shows the apparatus in combination with beam-splitter module 84. Beam splitter 84 is a mirror, which is transparent for a microscope viewer and, at the same time reflects both laser beams B, so that after reflection they coincide with the optical path 79 of microscope 18, i.e., they are directed to the target.

Each module is removably attached to steering mechanism 16, e.g., by a screw 90 or any other quick releasable connector. It is understood that three modules are given as an example, and that any other number of modules can be employed.

Steering mechanism 16 comprises a slave-master mechanism of the type described in U.S. Pat. No. 4,526,477 to W. Taylor, 1985 and consists essentially of a manipulating handle 92 and a universal joint converting mechanism (not shown), which translates movements of handle 92 into appropriate movements of the module. In other words, by manipulating the handle it is possible to change the solid state angle of the module, and thus the position of the reflected laser beam on the object being treated.

Steering mechanism 16 is attached to casing 14 by screws 98.

For convenience of the operation, casing 14 has a rigidly attached circular handrest 94, for example by screws 96, only one of which is shown in FIG. 1.

In one practical embodiment, the entire apparatus had a length of 20 cm, a casing diameter of 7 cm, a handrest diameter of 10 cm, and a tubular housing diameter of 6 cm. Most of the parts are made of aluminum. Irrespective of the laser source, the apparatus allowed focusing/defocusing of the laser spot from 10 microns to 10 mm in diameter. type described in U.S. Pat. No. 4,526,447 to W. Taylor, 1985 and consists essentially of a manipulating handle 92 and a universal joint converting mechanism (not shown), which translates movements of handle 92 into appropriate movements of the module. In other words, by manipulating the handle it is possible to change the solid state angle of the module, and thus the position of the reflected laser beam on the object being treated.

Steering mechanism 16 is attached to casing 14 by screws 98.

For convenience of the operation, casing 14 has a rigidly attached circular handrest 94, for example by screws 96, only one of which is shown in FIG. 1.

In one practical embodiment, the entire apparatus had a length of 20 cm, a casing diameter of 7 cm, a handrest diameter of 10 cm, and a tubular housing diameter of 6 cm. Most of the parts are made of aluminum. Irrespective of the laser source, the apparatus allowed focusing/defocusing of the laser spot from 10 microns to 10 mm in diameter.

Figure 3:
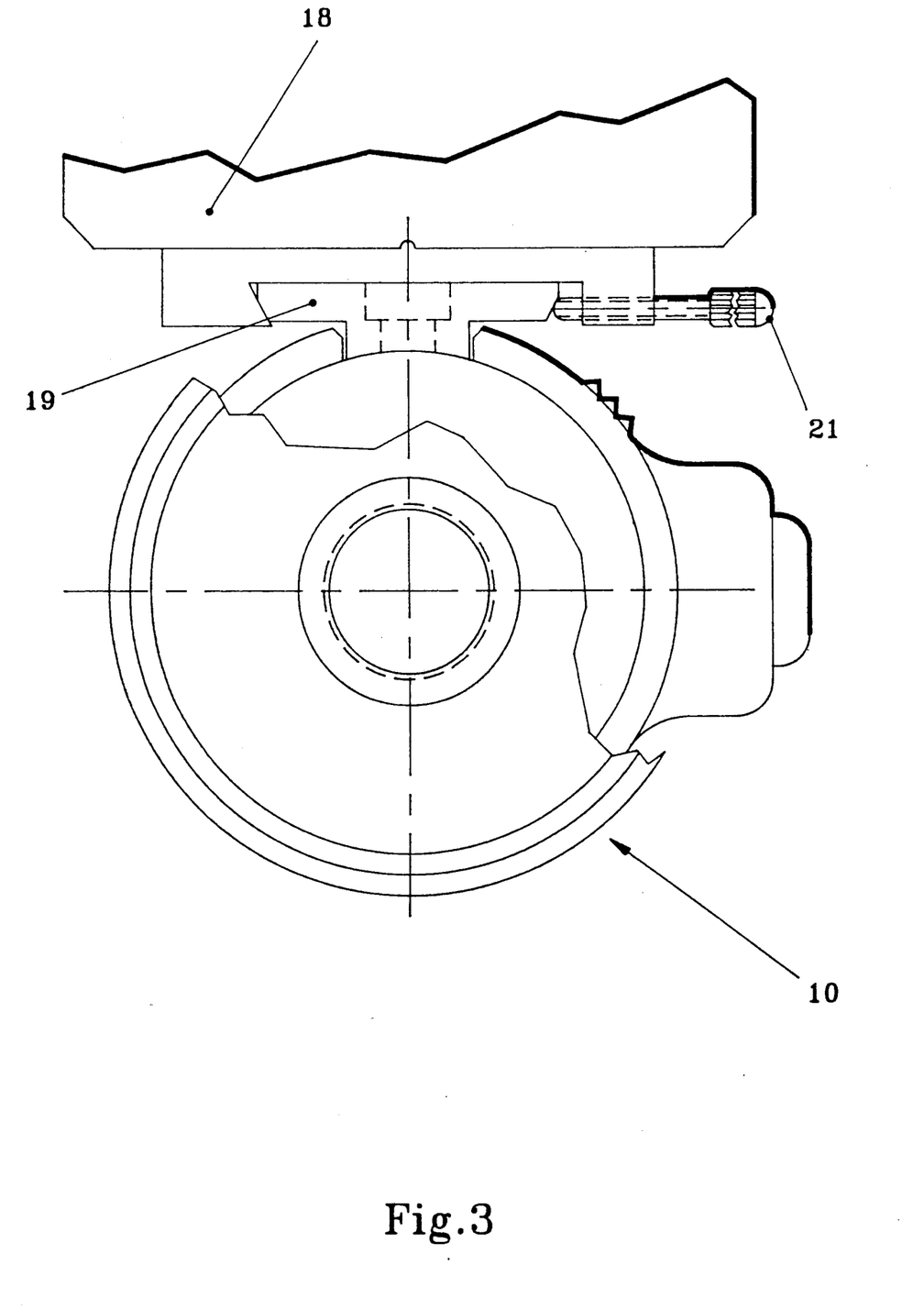
FIG. 3 is a fragmental sectional view of the apparatus along line 3—3 of FIG. 2 illustrating attachment of the apparatus to an operating microscope.
Figure 4:
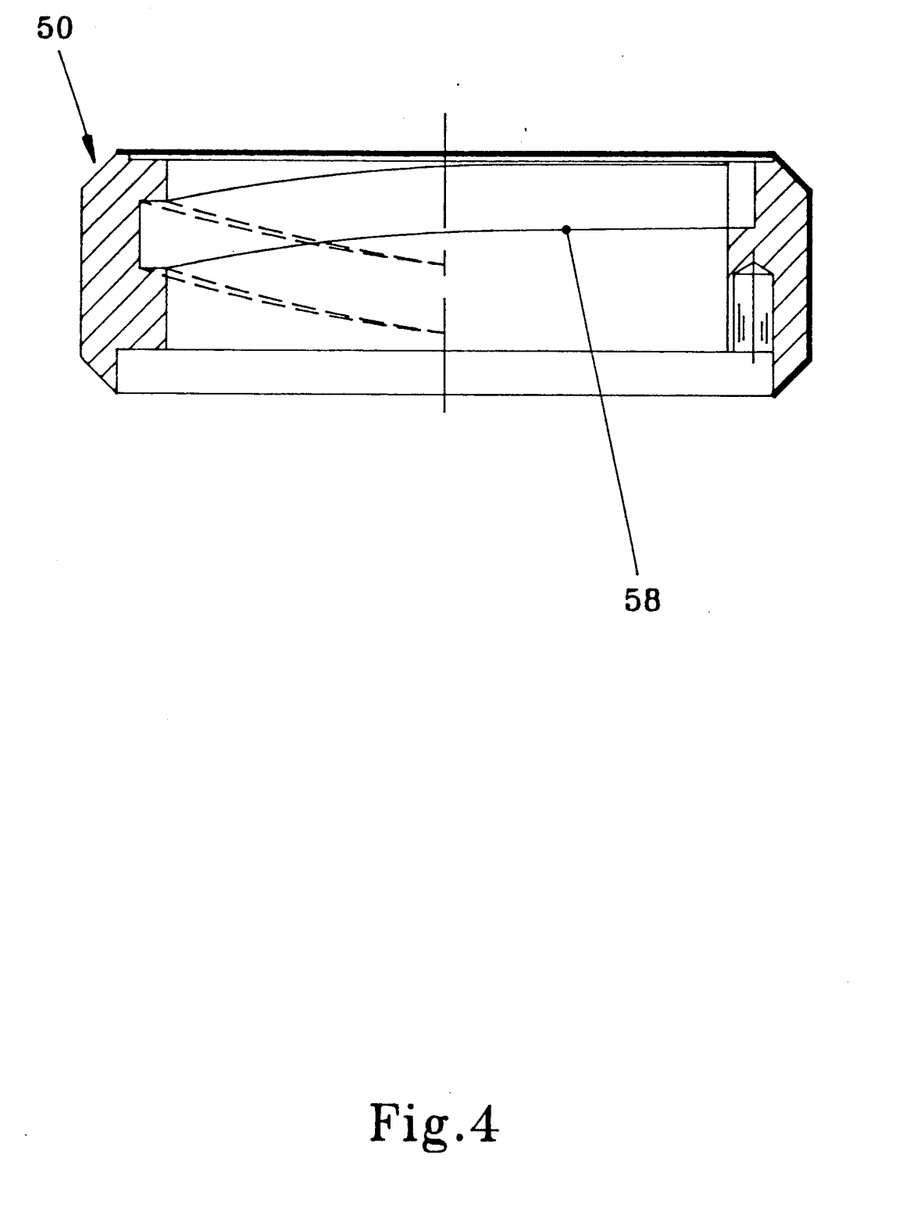
FIG. 4 is a fragmental sectional view of an adjustment ring used in the apparatus showing an internal helical slot used in such ring.

FIGS. 1-3-Operation of the Apparatus of the Invention

Prior to operation a surgeon (or assistant) installs apparatus 10 on operating microscope 18 through dovetail 19 and locks the apparatus in the operating position by turning screw 21.

The surgeon selects a modular unit required for the particular operation, e.g., beam splitter 84 (FIG. 2) would be selected for neurosurgical operation, then the modular unit is installed into the steering mechanism 16 and locked by screw 90.

Depending on the focal distance selected by the surgeon for the operation to be performed, adjustment ring 50 is turned with respect to sleeve 24 by aligning the appropriate marks of scale 62 with indicating marks 64. When adjustment ring 50 is turned, guide pin 44 engages helical groove 58, whereby first mirror holder 40 is shifted in the axial direction of laser beams B.

A laser source 20 is then connected to apparatus 10 through the articulating arm of fiber optic links (not shown in the drawings). Now the laser source is turned on for generating a guide or visible beam alone. A patient assumes an operating position on an operating table or chair. A visible beam B1 from laser source 20 passes through opening 42 in concave mirror 42 and is guided along optical path 78 to convex mirror 76. Since this mirror has a convex surface, visible guide beam B1 is reflected from this mirror in a diverging form shown by projection lines B2 in FIG. 2. Beam B2 falls onto the surface of concave mirror 42, which reflects the beam in a converging manner as designated by lines B3. This converging beam falls onto the front surface of beam splitter 84, wherefrom it is reflected in the direction perpendicular to optical path 78 and is guided along optical path 79 of the microscope to the target area (not shown). Now the surgeon accurately aims the visible beam onto operating site, viewing the position of the beam through the microscope 18. Depending on the type of the operation to be performed, the surgeon focuses or defocuses the laser beam spot on the target area by grasping rubber jacket 32 and sliding sleeve 24 over tubular housing 22 until the required spot size (not shown) is achieved. In fact, this type of movement changes the distance between the convex and concave mirrors, thus changing solid state angles of the beams.

Since the system of the present invention guarantees that the power beam will coincide with the visible guide beam and that dimensions of spot sizes will be identical, the surgeon can now switch on the power laser beam with full confidence, and is ready to start the operation.

In order to start the operation, the surgeon rests a wrist on handrest 94 in a comfortable position for stability and holds manipulating handle 92 of steering mechanism 16. The operation is performed through the above-mentioned masterslave mechanism, so that beam splitter 84 (or any other modular unit selected for the specific procedure) can describe any path required for positioning the beam in selected points on operation site. In fact, this action is similar to guiding the cursor on a computer monitor screen through a joystick.

If upon completion of a certain operation (such as an incision, which is performed with a small spot size using a $CO_2$ laser) the surgeon has to perform another operation (such as deep heating with argon laser), he/she needs merely to switch one laser source to another without changing the patient's position, i.e., without interrupting the surgical procedure. It is understood that all previous adjustments are preserved unchanged, and this is only a matter of minutes.

Figure 5:
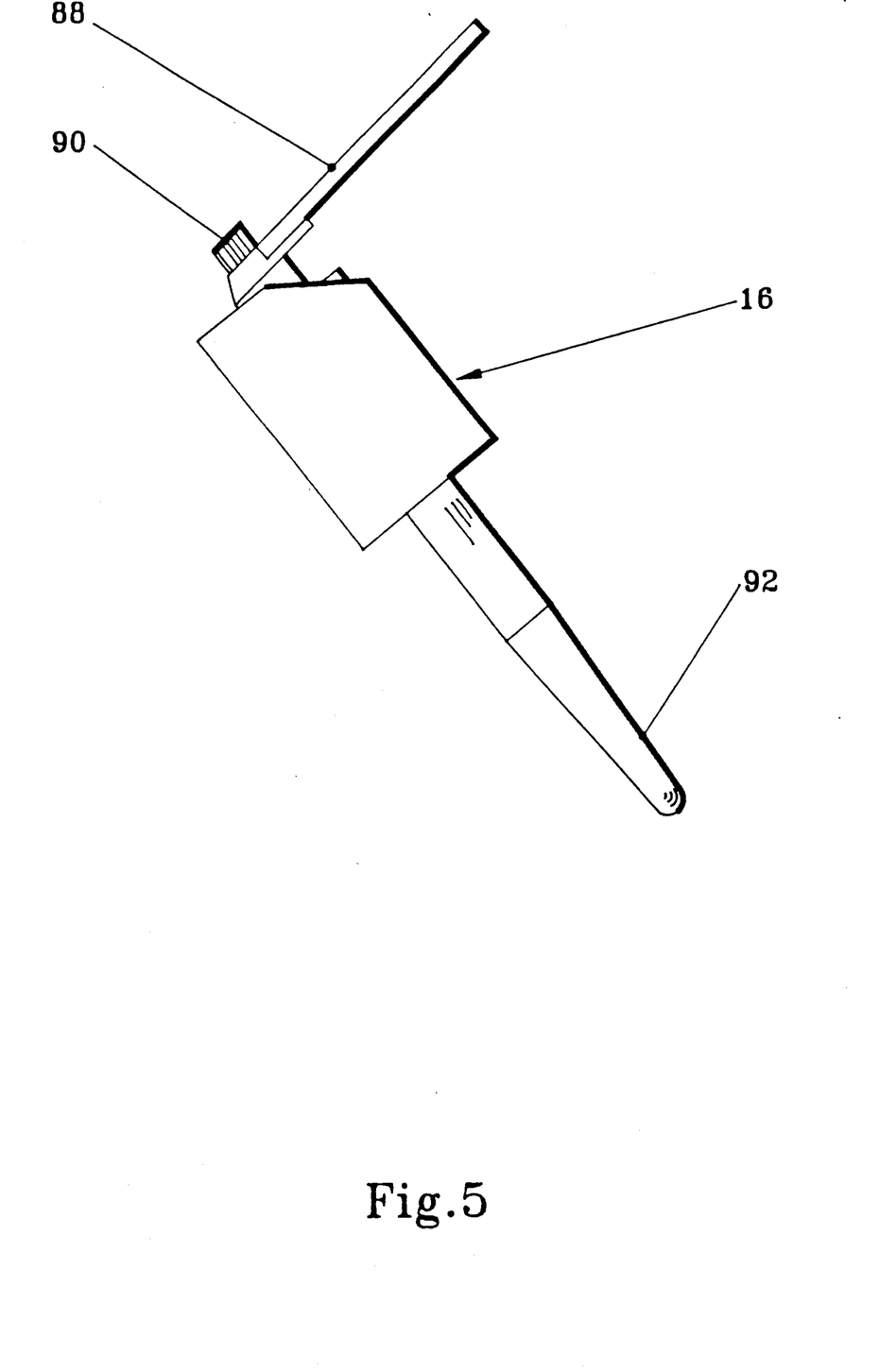
FIG. 5 is a view of a steering mechanism with a reflecting mirror module used in the apparatus.
Figure 6:
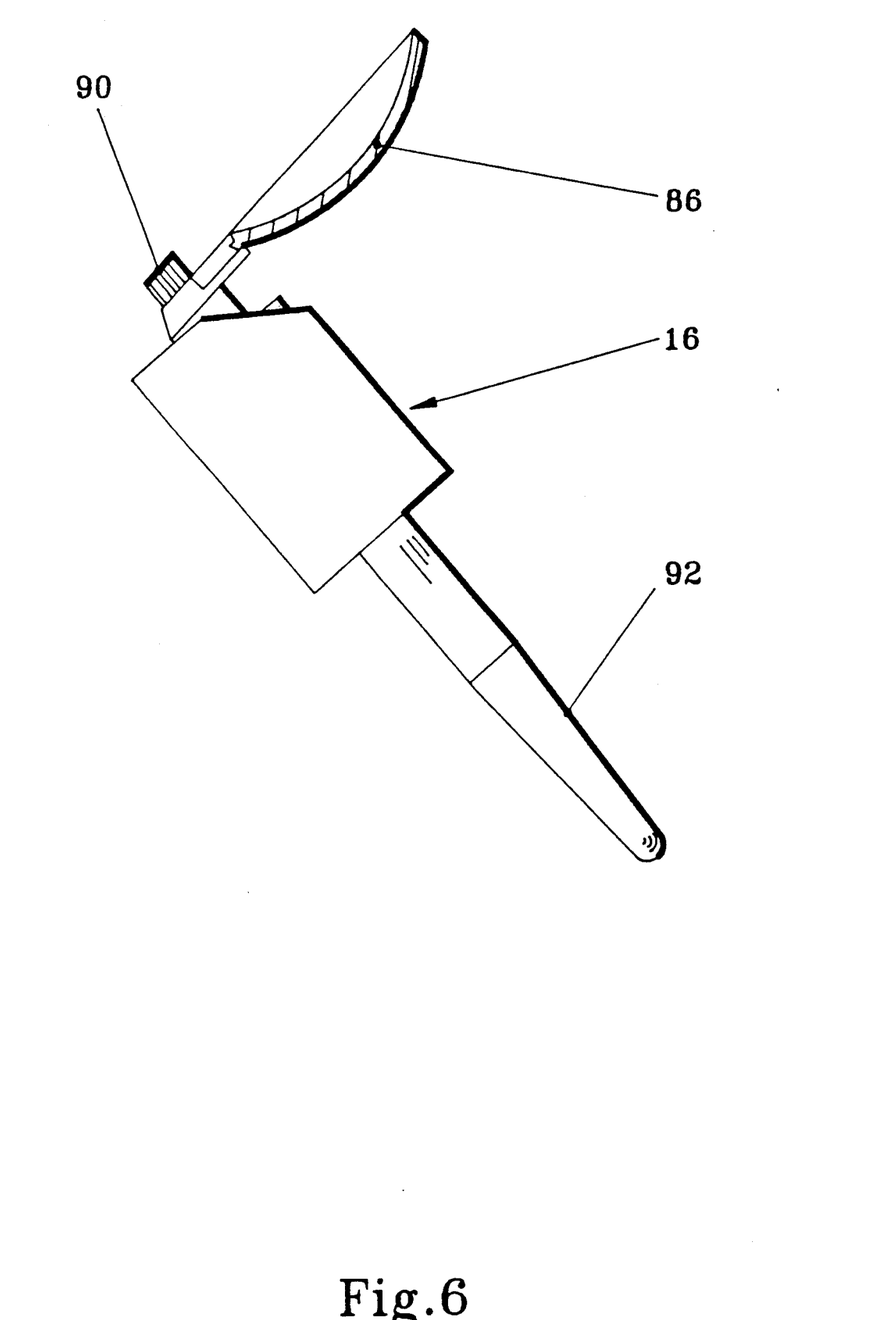
FIG. 6 is a view of a steering mechanism with a toroidal mirror module used in the apparatus.

Toroidal mirror modular 86 and reflecting mirror module 88 can be installed in the same manner as described above to perform surgical operations of different types.

Summary, Ramifications, and Scope

Thus it has been shown that the apparatus of the invention is simple in construction, easy to operate and inexpensive to manufacture. It is versatile in use, and can be utilized for various types of surgical procedures without replacement of its optical delivery systems. Also it has been shown that such modular apparatus substantially reduces energy losses, minimizes the spot-size diameter, broadens the range of focusing/defocusing capabilities, operates with all possible wavelength ranges of laser sources, and improves the surgeon's confidence in positioning the power and guide beams in the same target point.

Although, the apparatus of the invention has been described and illustrated with reference to the specific practical embodiment, it is understood that this embodiment was given only as an example and many modifications of the apparatus are possible. For example, casing and sleeve are not necessarily be formed from aluminum alloy, but can be molded from the thermo-resistant plastic. After the modular element, the optical systems can incorporate other mirrors or can be combined with optical elements. The shape and construction of casing 14 and handrest 94 may be different from those shown in the drawings. Manipulating handle 92 and steering mechanism 16 also may have different designs. For more accurate manipulation, handle 92 can be connected to a fine tuning thread mechanism. Modular units can be connected through quick-release snap-on mechanisms. The apparatus may have dimensions different from the exampling ones given in the description. It is obvious that the apparatus based on the principle of the invention can be utilized in fields other than medicine, for example for precision soldering of miniature parts, such as elements on PC boards, or drilling microscopic holes by laser beams in various materials. Steering mechanism 16 can be driven by the servomotors under the control of a computer. It is also undrestood that means, other than a microscope, can be used for observing the beam spot on the target area. The steering mechanism can be displaceable in the direction of its longitudinal axis and be slidingly installed in the casing.

Therefore the scope of the invention should be determined, not by the examples given, but the appended claims and their legal equivalents.

We claim:

1. A method of transforming and steering laser beams directed to an object to be treated, comprising the steps of:

providing a laser beam source for generating at least two laser beams working at respectively different wavelengths, at least one of said beams being visible and having an energy lower than the level required for treating said object, said second beam having an energy higher than said level, said beams coaxial and producing laser beam spot on a target area of said object, said spots being substantially identical in diameters;

providing an optical system, including a mirror, in the optical path of said beams from said laser source to said object;

providing a steering mechanism with a steerable beam reflecting unit in said optical path;

switching on said first beam and aiming it at said target area of said object;

switching on said second beam so that it forms on said target area a high-energy spot capable of treating said object; and treating said target area of said object by manipulating said high-energy spot through said steering mechanism while observing its position via said visible low-energy beam spot;

said optical system comprising at least two, i.e., first and second, optical mirrors with their mirror surfaces facing each other, said first mirror being located in an upstream position with respect to said second optical mirror and having means for passing said beams from said source to said second mirror without interfering with said beams, said first mirror having a concave surface, said second mirror having a convex surface, so that said beams being reflected from said second mirror in a diverging form onto said first mirror from which said beams are reflected into converging form onto said steerable beam reflecting unit, said unit directing said beams to said target area, said mirror optical system having means for adjusting the distance between said mirrors.

2. The method of claim 1, further including observation means for facilitating observation of said beams on said target, said observation means being connected to said optical system.

3. The method of claim 2 wherein said observation means comprises a microscope having an optical axis coincident with the section of said path from said steerable beam reflecting unit to said object.

4. The method of claim 3 wherein steerable beam reflecting unit is a replaceable modular unit.

5. The method of claim 4 wherein said modular unit is a beam splitter, said beam splitter reflecting said converging beams toward said object and simultaneously producing an unobstructed view for a micoscope viewer.

6. The method of claim 4 wherein said modular unit is a reflecting mirror module.

7. The method of claim 4 wherein said modular unit is a toroidal mirror module.

8. An apparatus for transforming and steering laser beams directed to an object to be treated, comprising:
- a casing with a view opening;
- a laser beam source for generating at least two laser beams of respectively different wavelengths, at least one said beams being visible and having an energy lower than the level required for treating said object, said second beam having an energy higher than said level, both beams being coaxial and producing laser beams spots on a target area of said object, said spots substantially coinciding with each other and having substantially identical diameters;
- a mirror optical system located in said casing in the optical path of said beams from said laser source to said object; and
- a steering mechanism with a steerable beam reflecting unit placed in said optical path;
- said mirror optical system comprising at least two, i.e., first and second, optical mirrors with their mirror surfaces facing each other, said first mirror being located in an upstream position with respect to said second optical mirror and having means for passing said beams from said source to said second mirror without interfering with said beams, said first mirror having a concave surface, said second mirror having a convex surface, so that said beams being reflected from said second mirror in a diverging form onto said first mirror from which said beams are reflected into converging form, said steerable beam reflecting unit being installed on a section of said optical path of said beams and directing said beams to said target area, said mirror optical system having means for adjusting the distance between said mirrors, said first and second mirrors being supported in first and second mirror holders, respectively.

9. The apparatus of claim 8 wherein said mirror optical system comprises a tubular rigidly connected to said casing and supporting said first concave mirror and a cylindrical telescope sleeve slidingly fitted on said tubular housing, said cylindrical telescopic sleeve supporting said first concave mirror, said adjusting means changing said distance between said mirror by shifting said cylindrical telescopic sleeve with respect to said tubular housing, said means for passing said beams from said source to said second mirror comprising a hole in said first mirror.

10. The apparatus of claim 9, further including observation means for facilitating observation of said beams on said target, said optical system being operatively connected to said observation means.

11. The apparatus of claim 10 wherein said observation means comprises a microscope having an optical axis coincident with the section of said optical path from said steerable beam reflecting unit to said object.

12. The apparatus of claim 11, further including means for discretely adjusting said distance between said mirrors in accordance with the focal distance of said microscope.

13. The apparatus of claim 12 wherein said adjusting means comprises an adjustment element movable with respect to said cylindrical telescopic sleeve and engageable with an element connected to said first mirror, so that displacement of said adjustment with respect to said sleeve causes displacement of said first mirror with respect to said second mirror, said sleeve having discretely arranged fixation elements, and said element of said mirror having a locking element engageable with said fixation elements.

14. The apparatus of claim 13 wherein said movable adjustment element comprises a ring member, which is installed rotatably on said sleeve, but fixed against axial displacements with respect to said sleeve, and wherein said element connected to said first mirror comprises a pin engageable with a helical groove formed in said first mirror holder, so that rotation of said ring causes displacement of said first mirror with respect to said second mirror, said discretely arranged fixation elements comprising indents arranged circumferentially on the end face of said sleeve and said locking element comprising a spring-loaded member.

15. The apparatus of claim 8 wherein said steerable beam reflecting unit is a replaceable modular unit.

16. The apparatus of claim 15 wherein said replaceable modular unit is a beam splitter which reflects said covering beams toward said object and simultaneously produces an unobstructed view for a microscope viewer.

17. The apparatus of claim 15 wherein said modular unit is a reflecting mirror module.

18. The apparatus of claim 15 wherein said modular unit is a toroidal mirror module.

19. The apparatus of claim 8, further including a handrest rigidly connected to said casing, said steering mechanism having a manipulating handle arranged so that a surgeon can manipulate said steerable beam reflecting unit by grasping said handle while resting a wrist on said handrest.

20. An apparatus for transforming and steering laser beams directed to an object to be treated, comprising:
- a casing with a view opening and a handrest;
- a laser beam source for generating at least two laser beams of respectively different wavelengths, at least one of said beams being visible and having an energy lower than the level required for treating said object, said second beam having an energy higher than said level, both beams being coaxial with respect to each other and producing laser beam spots on a target area of said object, said spots substantially coinciding with each other and having substantially identical diameters;
- a mirror optical system located in said casing in the optical path of said beams from said laser source to said object; and
- a steering mechanism with a steerable beam reflecting unit placed in said optical path, said mirror optical system comprising a first optical mirror and second optical mirror with mirror surfaces facing each other, said first mirror being located in an upstream position with respect to said second optical mirror and having an opening for passing said beams from said source to said second mirror without interfering with said beams, said first mirror having a concave surface, said second mirror having a convex surface, so that said beams being reflected from said second mirror in a diverging manner onto said first mirror from which said beams are reflected in a converging manner, said steerable beam reflecting unit being installed on a section of said optical path of said beams so as to direct said beams of said target area, said mirror optical system having means for adjusting the distance between said mirrors, said first and second mirrors being supported in a first and second mirror holders, respectively, said mirror optical system comprising a tubular housing rigidly connected to said casing and supporting said first concave mirror and a cylindrical telescopic sleeve slidingly fitted on said tubular housing, said cylindrical telescope sleeve supporting said first concave mirror, said adjusting means changing said distance between said mirror by shifting said cylindrical telescopic sleeve with respect to said tubular housing, said mirror optical system being connected to a microscope having an optical axis coincident with the section of said optical path from said steerable beam reflecting unit to said object.

21. The apparatus of claim 20, further including means for discretely adjusting said distance between said mirrors in accordance with the focal distance of said microscope, said adjusting means comprising an adjustment element movable with respect to said cylindrical telescopic sleeve and engageable with an element connected to said first mirror, so that displacement of said adjustment with respect to said sleeve causes displacement of said first mirror with respect to said second mirror, said sleeve having discretely arranged fixation elements, and said element of said mirror having a locking element engageable with said fixation elements.

22. The apparatus of claim 21 wherein said movable adjustment element comprises a ring member, which is installed rotatably on said sleeve but fixed against axial displacements with respect to said sleeve, and wherein said element connected to said first mirror comprises a pin engageable with a helical groove formed in said first mirror holder, so that rotation of said ring causes displacement of said first mirror with respect to said second mirror, said discretely arranged fixation elements comprising indents arraged circumferentially on the end face of said sleeve, and said locking element comprising a spring-loaded member.

23. The apparatus of claim 20 wherein said steerable beam reflecting unit is a replaceable modular unit.

24. The apparatus of claim 23 wherein said replaceable modular unit is a beam splitter which reflects said converging beams towards said object and simultaneously produces unobstructed vision for a microscope viewer.

25. The apparatus of claim 23 wherein said modular unit is a reflecting mirror module.

26. The apparatus of claim 23 wherein said modular unit is toroidal mirror module.

27. The apparatus of claim 20 wherein said steering mechanism has a manipulating handle arranged so that a surgeon can manipulate said steerable beam reflecting unit by grasping said handle with the fingers while resting with the wrist on said handrest.

* * * * *